(12) United States Patent
Wu et al.

(10) Patent No.: US 7,324,453 B2
(45) Date of Patent: Jan. 29, 2008

(54) CONSTRAINT-BASED SHORTEST PATH FIRST METHOD FOR DYNAMICALLY SWITCHED OPTICAL TRANSPORT NETWORKS

(75) Inventors: Fuming Wu, Frisco, TX (US); Frederick H. Skoog, Colleyville, TX (US)

(73) Assignee: Alcatel Lucent, Paris (FR)

( * ) Notice: Subject to any disclaimer, the term of this patent is extended or adjusted under 35 U.S.C. 154(b) by 1040 days.

(21) Appl. No.: 10/320,286

(22) Filed: Dec. 16, 2002

(65) Prior Publication Data

US 2004/0042406 A1 Mar. 4, 2004

Related U.S. Application Data

(60) Provisional application No. 60/407,094, filed on Aug. 30, 2002.

(51) Int. Cl.
*H04J 1/16* (2006.01)
*H04J 3/14* (2006.01)

(52) U.S. Cl. .................. 370/238; 370/254; 370/392; 370/468

(58) Field of Classification Search .............. None
See application file for complete search history.

(56) References Cited

U.S. PATENT DOCUMENTS

| | | | |
|---|---|---|---|
| 4,905,233 A | 2/1990 | Cain et al. | |
| 5,067,127 A | 11/1991 | Ochiai | |
| 5,088,032 A | 2/1992 | Bosack | |
| 6,016,306 A | 1/2000 | Le Boudec et al. | |
| 6,301,244 B1 | 10/2001 | Huang et al. | |
| 6,633,544 B1* | 10/2003 | Rexford et al. | 370/238 |
| 6,785,737 B2* | 8/2004 | Lee et al. | 709/241 |
| 6,842,463 B1* | 1/2005 | Drwiega et al. | 370/468 |
| 6,925,061 B2* | 8/2005 | Lee et al. | 370/238 |
| 2003/0118024 A1* | 6/2003 | Lee et al. | 370/395.1 |
| 2003/0185153 A1* | 10/2003 | Kohler et al. | 370/230 |

OTHER PUBLICATIONS

Rajagopalan, et al.; IP Over Optical Networks: Architectural Aspects; IEEE Communications Magazine; Sep. 2000; pp. 94-102; vol. 38, NR 9.

Kodialam, et al.; Restorable Dynamic Quality of Service Routing; IEEE Communications Magazine; Jun. 2000; pp. 72-81; vol. 40, NR 6.

Szviatovszki, et al.; Minimizing Re-Routing in MPLS Networks with Preemption-Aware Constraint-Based Routing; Computer Communications; Elsevier Science Publishers BV; Amsterdam, NL; Jul. 1, 2002; pp. 1076-1084; vol. 25, NR 11-12.

(Continued)

*Primary Examiner*—Chirag G. Shah
(74) *Attorney, Agent, or Firm*—Jessica W. Smith; Bobby D. Slaton

(57) ABSTRACT

Method and apparatus for implementing a constraint-based shortest path first ("CSPF") technique for dynamically switched optical transport networks are described. One embodiment comprises a traffic network element ("TNE") in a network comprising a traffic engineering network database ("TEND") that stores network topology information for the network and bandwidth availability information for links in the network; and a routing engine that receives a request for a label switched path ("LSP") with specified constraints, processes network topology information from the TEND to create a network graph comprising links meeting the specified constraints, and computes a primary path through the network, wherein the primary path comprises links selected from the network graph.

22 Claims, 2 Drawing Sheets

OTHER PUBLICATIONS

Papadimitriou, et al.; Inference of Shared Risk Link Groups; IETF Internet Working Group; Internet Draft; Jan. 2002; pp. 1-31.
J. Doyle, Routing TCP/IP, vol. 1, Macmillan Technical Publishing, 198, pp. 176-181.
Nortel, IP Traffic Engineering for Carrier Networks: Using Constraint-Based Routing to Deliver New Services, 1999, pp. 1-8.
Xiao, et al., Traffic Engineering with MPLS in the Internet, IEEE Network, Mar.-Apr. 2000, pp. 28-33, vol. 14, Issue 2.

* cited by examiner

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| transactionId ||||||||||||||||||||||||||||||||
| requestType ||||||||||||||||||||||||||||||||
| srcNode ||||||||||||||||||||||||||||||||
| dstNode ||||||||||||||||||||||||||||||||
| protectionType ||||||||||||||||||||||||||||||||
| nodeSet ||||||||||||||||||||||||||||||||
| linkSet ||||||||||||||||||||||||||||||||
| srlgSet ||||||||||||||||||||||||||||||||

FIG. 3

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| transactionId ||||||||||||||||||||||||||||||||
| pStatus ||||||||||||||||||||||||||||||||
| primaryEro ||||||||||||||||||||||||||||||||
| bStatus ||||||||||||||||||||||||||||||||
| backupEro ||||||||||||||||||||||||||||||||

FIG. 4

500 — Build Network Graph

502 — Calculate Primary ERO From Network Graph

504 — Prune Network Graph

506 — Calculate Backup ERO From Pruned Network Graph

FIG. 5

CONSTRAINT-BASED SHORTEST PATH FIRST METHOD FOR DYNAMICALLY SWITCHED OPTICAL TRANSPORT NETWORKS

PRIORITY UNDER 35 U.S.C. §119(e) & 37 C.F.R. §1.78

This nonprovisional application claims priority based upon the following prior U.S. provisional patent application entitled: A Constraint-Based Shortest Path First Scheme For Fiber Switching, Ser. No. 60/407,094, filed Aug. 30, 2002, in the names of Fuming Wu and Frederick H. Skoog, which is hereby incorporated by reference for all purposes.

BACKGROUND OF THE INVENTION

1. Technical Field of the Invention

The present invention generally relates to dynamically switched optical transport networks. More particularly, and not by way of any limitation, the present invention is directed to a constraint-based shortest path first method for such networks.

2. Description of Related Art

Of the functions performed by a transport network, traffic routing (i.e., the steering of traffic through the transport network in the most effective way) and service provisioning are of primary importance. Historically, these functions have been performed manually. In the near future, it is likely that these functions will be performed using a combination of the latest technologies, including Traffic Engineering ("TE") and Generalized Multi-Protocol Label Switch ("GMPLS") technologies. TE supports the network-wide performance optimization. GMPLS supports the switching of network services based on Internet-based algorithms.

Typically, upon receiving a network traffic demand, a signaling entity in an ingress transport network element ("TNE") signals the creation of a Label Switched Path ("LSP") on a predetermined strict explicit route using a network resource reservation protocol, such as RSVP-TE or LDP. To determine a strict explicit route for each traffic flow, a path selection algorithm that can be initiated in an on-demand basis must be implemented in each TNE in the GMPLS transport domain. The determined strict explicit route must fulfill traffic demands, including level of service and diversity requirements, and route specifications, including the ingress and egress TNE addresses. The transport network resource availability and its topological information are critical for successful setup of the corresponding LSP and are maintained and frequently updated in the TE network database ("TEND") by a TE Internet Gateway Protocol ("TE-IGP"), such as OSPF-TE or ISIS-TE. As the determination of a strict explicit route is in-line in the path establishment timeline, the performance of the path selection method is of primary importance to minimize setup delays.

Constraint-based routing ("CBR") in the GMPLS control plane domain is one of the main processes required for on-demand service provisioning, or "bandwidth-on-demand", and for dynamic service restoration, which are considered two of the main incentives for the use of GMPLS in optical transport networks ("OTNs"). CBR is defined as the mechanism for computing a feasible network path from a source, or ingress, TNE traffic bearing port to a destination, or egress, TNE traffic bearing port on a network demand, which includes a set of traffic description parameters and a set of service constraint parameters for the desired connection path. The key technical issues with respect to CBR are determining a set of constraint parameters to be taken into account during path calculation, developing a path selection algorithm for calculating the most competitive path from an ingress TNE to an egress TNE within the OTN domain, and performing the path calculation in the shortest amount of time possible to minimize connection cut-through time.

For many service providers, providing multiple levels of service to meet different customer requirements is vital for the success of their businesses. The ability to provide resource assurance and service differentiation in a network, whether public or private, is often referred to as "Quality of Service" ("QoS"). Implementation of some form of CBR in GMPLS domains to support QoS functionality is a prominent issue both in research and development areas of telecommunications.

Various solutions may exist for implementing limited forms of CBR in a GMPLS domain, depending on the constraints and type of transport network under consideration; however, there is no known solution supports the level of flexibility that will be desirable in connection with current and future transport networks.

SUMMARY OF THE INVENTION

Accordingly, the present invention advantageously provides method and apparatus for implementing a constraint-based shortest path first ("CSPF") technique for dynamically switched optical transport networks.

One embodiment comprises a traffic network element ("TNE") in a network comprising a traffic engineering network database ("TEND") that stores network topology information for the network and bandwidth availability information for links in the network; and a routing engine that receives a request for a label switched path ("LSP") with specified constraints, processes network topology information from the TEND to create a network graph comprising links meeting the specified constraints, and computes a primary path through the network, wherein the primary path comprises links selected from the network graph.

Another embodiment comprises a method of computing an explicit route through a network comprising receiving a path setup request message for a new traffic flow in the network, wherein the path setup request message includes specified constraints on the path; generating a network graph from network information stored in a traffic engineering network database ("TEND"), wherein links not meeting the specified constraints for the path are eliminated from the graph; and calculating a primary explicit route through the network from the generated network graph.

Another embodiment comprises a traffic network element ("TNE") in a network, the TNE comprising means for storing network topology information for the network and bandwidth availability information for links in the network; and means for processing information from the TEND to create a network graph comprising links meeting specified constraints in a request for a label switched path ("LSP") and calculating a primary explicit route through the network, wherein the primary explicit route comprises links selected from the network graph.

BRIEF DESCRIPTION OF THE DRAWINGS

A more complete understanding of the present invention may be had by reference to the following Detailed Description when taken in conjunction with the accompanying drawings wherein:

FIG. 3 is a graphical representation of a path computation request message in accordance with one embodiment;

FIG. 4 is a graphical representation of a path computation response message in accordance with one embodiment; and FIG. 5 is a flowchart of the operation of a CSPF method of one embodiment.

DETAILED DESCRIPTION OF THE DRAWINGS

Figure 1:
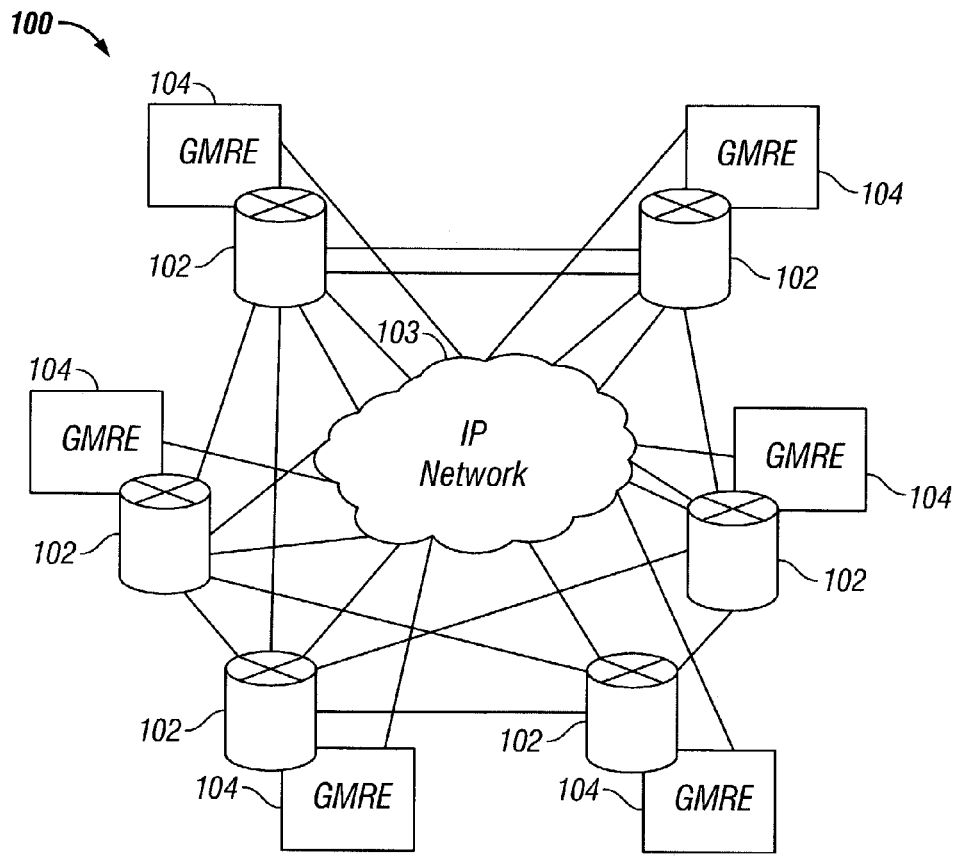
FIG. 1 is a block diagram of an Optical Transport Network in accordance with one embodiment.

In the drawings, like or similar elements are designated with identical reference numerals throughout the several views thereof, and the various elements depicted are not necessarily drawn to scale.

FIG. 1 is a block diagram of a GMPLS optical transport network ("OTN") 100 in accordance with one embodiment. The OTN 100 comprises a plurality of transport network elements ("TNEs"), or nodes, represented in FIG. 1 by TNEs 102, interconnected by links comprising an IP network 103. Each TNE 102 includes a GMPLS routing engine ("GMRE") 104, which will be described in greater detail with reference to FIG. 2.

Figure 2:
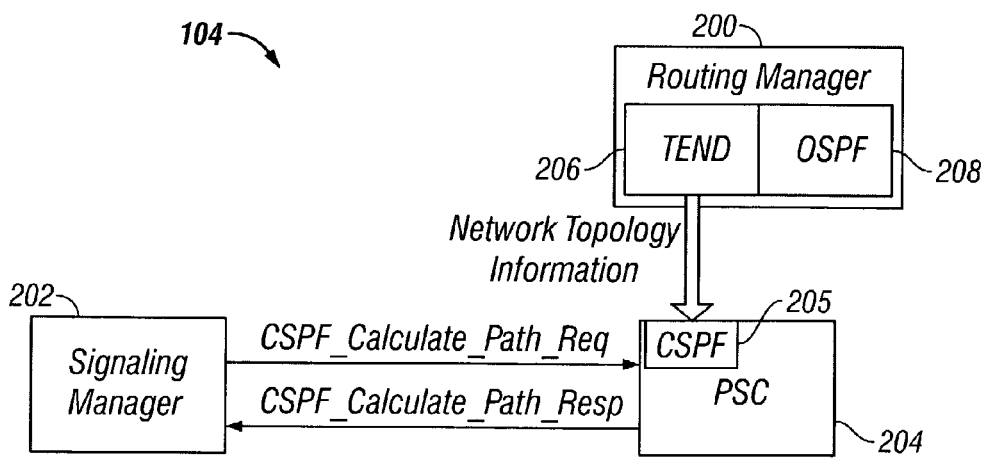
FIG. 2 is a block diagram of a portion of a GMRE of FIG. 1.

Referring to FIG. 2, each GMRE 104 comprises a set of subsystems, including a Routing Manager ("RM") 200, a Signaling Manager ("SM") 202, and a Path Selection Component ("PSC") 204 for implementing a CSPF technique 205 of one embodiment. The SM 202 is responsible for signaling the creation of Label Switched Paths ("LSPs"). To provide this functionality, an ideal method for the SM is to assign a new Resource Reservation Protocol Traffic Engineering Extension ("RSVP-TE") session for each end-to-end traffic flow on the ingress TNE 102. The SM 202 relies on a number of extensions of the RSVP. A predetermined Explicit Route Object ("ERO") enables an RSVP PATH message to request that intermediate TNEs provide a label binding for the LSP that it is establishing. The Label Object enables RSVP to support the distribution of Labels from upstream TNEs to downstream TNEs via an RSVP PATH message.

The PSC 204 is connected to and functions independently from the SM 202. The function of the PSC 204 is to determine the ERO(s) for each end-to-end traffic flow by applying the CSPF technique 205 to the information residing in a Traffic Engineering Network Database ("TEND") 206 on the ingress TNE 102. The TEND 206 forms a part of and is maintained by an IP-based Interior Gateway Protocol ("IGP") component 208. The TNEs 102 share network topology information among themselves using the IGP, which in the embodiment illustrated in FIG. 2 is OSPF, but may be another IGP, such as IS-IS. The network topology information maintained in the TEND 206 is made available to the PSC 205 to enable a path calculation process as described hereinbelow.

The CSPF technique 205 is a path calculation method that takes into account a set of specific restrictions, or constraints, when calculating the shortest path across the OTN 100. In one embodiment, the CSPF technique 205 is capable of producing up to two EROs for each path calculation request message from the SM 202. This is primarily due to the fact that the information about the available resources of the OTN 100 is based on the allocation status; that is, the unreserved bandwidth of TE links change with the same time-scale as the LSP arrival/departure process. The TEND 206 in a TNE 102 may not always timely reflect the exact status of the available resources in the OTN 100. The existence of an ERO may not guarantee that the ERO is workable until the LSP is actually established.

For the foregoing reasons, it is logical for the SM 202 to request two EROs for a single traffic demand. These two EROs are referred to as the primary ERO and the backup ERO. The primary ERO is the least expensive (defined in terms of the sum of the link metrics of all of the TE links included in the ERO) ERO that meets all of the specified constraints. The backup ERO is the most competitive path among the EROs that meet all of the specified constraints that is link-diverse, node-diverse and/or SRLG-diverse with the primary ERO.

The CSPF technique 205 also considers the load-balancing issue, in that the TE link with the maximum unreserved bandwidth will be chosen if there are two or more TE links between a pair of TNEs 102 with the same minimal cost. This strategy also decreases the probability of failure of the corresponding signaling session.

It will be assumed for purposes of example herein that the OTN 100 comprises only one autonomous system or OSPF area and that all of the connections are bi-directional, although the network topology is modeled as a directed graph, since unidirectional connections can also be supported.

In one embodiment, path calculation request messages ("CSPF_Calculate_Path_Req") issued by the SM 202 to the PSC 204 can only be processed in a serial manner. This means that the issuer of a path calculation request must wait for a path calculation response message ("CSPF_Calculate_Path_Resp") from the CSPF component 204a of the PSC 204 before processing the next request. Upon receiving the primary ERO and/or the backup ERO from the PSC 204, the SM 202 will first attempt to invoke the primary ERO to a new RSVP session. The back up ERO is used for the RSVP session if the primary ERO fails.

The traffic engineering extension of the OSPF component 208 is the network information gathering component in the RM 200. The OSPF component 208 builds the topological map augmented with information about network resource availability, e.g., link protection scheme, unreserved bandwidth, minimal LSP bandwidth, maximal LSP bandwidth, link metric, and Shared Risk Link Group ("SRLG"), and switching capability information for each link. All of the information is maintained in the TEND 206 of the OSPF component 208.

From the CSPF_Calculate_Path_Req message and the TEND 206, the PSC 204 collects the information required as input to the CSPF technique 205 at the time it receives a path calculation request from the SM 202. This information includes the route specification (i.e., the source and destination TNE addresses), traffic demands (i.e., service level and diversity requirements); and network resource availability information. Based on this information, the PSC 204 performs a calculation by executing the CSPF technique 205 and returns the resulting ERO(s) to the SM 202 in the form of a CSPF_Calculate_Path_Resp message.

The following constraints may be specified for ERO calculation in accordance with one embodiment: (1) link protection type; (2) diversity type; and (3) cost metric. Supported link protection types include unprotected, dedicated 1+1, dedicated 1:1, and AnyType. A data-bearing link is said to be "unprotected" if there is no backup link for traffic being carried on the link. A data-bearing link is said to be "dedicated 1+1" if a disjoint backup data-bearing link is reserved and dedicated for protecting the primary data-bearing link. This backup data-bearing link is not shared by any other connection and traffic is duplicated and carried simultaneously over both links. A data-bearing link is said to be "dedicated 1:1" if a disjoint backup data-bearing link of type "Extra Traffic" is reserved for protecting the primary link. For an LSP having a protection type of "AnyType", the LSP is to be routed over any available links.

Supported diversity types include shared risk link group ("SRLG"), node, and link. A set of data-bearing links is said to constitute an SRLG if they share a resource whose failure will affect all links in the set. An SRLG can be identified by its identifier, which is global unique. A data-bearing link may belong to multiple SRLGs. The SRLG set of a given data-bearing link is the union of the SRLG identifiers that correspond to the SRLGs to which the data-bearing link belongs.

Two LSPs are said to be node diverse if they share no common intermediate node(s). Two LSPs are said to be link diverse if there is no data-bearing link pairs from the different LSPs that belong to the same TE link. For example, assuming that ERO1 and ERO2 are the primary EROs that correspond respectively to LSP1 and LSP2, then to say that LSP1 is link diverse with LSP2 is to say that ERO1 and ERO2 have no common TE link; that is, the set of all TE links belonging to ERO1 and the set of all TE links belonging to ERO2 are disjoint.

With regard to cost metric, the CSPF technique 205 selects the primary ERO and/or the backup ERO capable of satisfying the specified constraints (i.e., protection and diversity requirements) while at the same time attempting to minimize the total cost of ERO hops. The cost of an ERO hop is measured by the link metric of the selected TE link.

An ERO calculated by the CSPF technique 205 consists of a sequence of TE links that represent the ordered series of hops of the ERO. For each hop, the CSPF technique 205 specifies a pair (node ID, interface ID) followed by the SRLG information of the hop. The "node ID" is the address of the local TNE and the "interface ID" is the outgoing interface ID of the corresponding TE link. The SRLG information of the hop is provided by the SRLG set of the corresponding TE link.

As previously indicated, a CSPF_Calculate_Path_Req message is sent from the SM 202 to the PSC 204 to request calculation of one or two strict EROs for a traffic demand. The CSPF_Calculate_Path_Req message is graphically represented in FIG. 3 and designated by a reference numeral 300. As illustrated in FIG. 3, the message 300 includes a transactionID field 302, the contents of which indicate the transaction identifier of the request; a requestType field 304, the contents of which indicate the number of EROs that need to be calculated for the request; an srcNode field 306, the contents of which indicate the IP address of the source TNE; a dstNode field 308, the contents of which indicate the IP address of the destination TNE; a protectionType field 310, the contents of which indicate the requested protection type of the resulting ERO; a nodeSet field 312, the contents of which indicate the list of TNEs with which a resulting ERO is diverse; a linkset field 314, the contents of which indicate the list of TE links with which a resulting ERO is diverse; and an srlgSet field 316, the contents of which indicate a list of SRLG identities with which a resulting ERO is diverse.

As previously indicated, a CSPF_Calculate_Path_Resp message is sent from the PSC 204 to the SM 202 to request calculation of one or two strict EROs for a traffic demand. The CSPF_Calculate_Path_Resp message is graphically represented in FIG. 4 and designated by a reference numeral 400. As illustrated in FIG. 4, the message 400 includes a transactionID field 402, the contents of which indicate the transaction identifier of the request; a pStatus field 404, the contents of which indicate the calculation status of the primary ERO; a primaryEro field 406, the contents of which provide the complete information of the primary ERO; a bStatus field 408, the contents of which indicate the calculation status of the backup ERO (if required); and a backupEro field 410, the contents of which indicate the complete information of the backup ERO (if required).

For purposes of example, an embodiment of the invention will be described with reference to an OTN comprising 30 nodes, represented in FIG. 1 by the six nodes 102; however, it should be recognized that the size of an OTN in which the invention described herein is implemented, in terms of provisioned nodes and interconnection links, may be larger or smaller.

Several assumptions are made with respect to the OTN 100 in order to demonstrate the performance of the embodiments described herein. First, all of the data bearing links, or fibers, in the OTN 100 have the same bandwidth per traffic channel. Next, data-bearing links between a pair of TNE nodes 102 are combined into TE links 106. Transport network resource availability information is populated by the TE-IGP per TE link 106. All of the data-bearing links in the same TE link 106 have the same protection type. Additionally, all of the data-bearing links in the same TE link 106 belong to the same set of shared risk link groups ("SRLGs"). Finally, as an optimization to increase performance, network topology information is maintained in an optimized data table structure.

As illustrated in FIG. 5, one embodiment of the CSPF method comprises four functional steps, including building a network graph (step 500), calculating the primary ERO using the network graph (step 502), pruning the network graph (step 504), and calculating the backup ERO from the pruned network graph (step 506). Each of steps 500-506 will be described in greater detail below.

In particular, in step 500, network topology and resource availability information is read from the TEND 206 and produces a network graph by eliminating the TE links that do not have the protection type indicated in the field 310 of the CSPF_Calculate_Path_Req message 300 and are not diverse with the SRLG set indicated in the field 316 of the CSPF_Calculate_Path_Req message. The TE links between a pair of TNEs are inserted into the network graph in increasing order of increasing link metric. TE links with the same link metric are inserted in decreasing order of unreserved bandwidth metric. In step 502, the primary ERO is obtained by applying an SPF algorithm, such as Dijkstra's SPF, to the network graph developed in step 500. In step 504, if a backup ERO has been requested, as indicated by the contents of the field 302 of the CSPF_Calculate_Path_Req message 300, is required, the network graph developed in step 500 is pruned to meet the diversity requirement with respect to the primary ERO, as specified by the contents of the field 316 of the CSPF_Calculate_Path_Req message. Specifically, all TE links in the network graph that are not diverse with primary ERO are pruned from the network graph to create a pruned network graph.

In step 506, the backup ERO is determined by applying a SPF algorithm, such as Dijkstra's SPF algorithm, to the pruned network graph determined in step 504. The result of step 506 is the backup ERO. It will be recognized that if only one (i.e., a primary) ERO has been requested, steps 504 and 506 will not be performed.

Subsequent to the calculation of the primary ERO and, if necessary, the backup ERO as illustrated in FIG. 5, information identifying the ERO(s) is relayed back to the SM 202 via the CSPF_Calculate_Path_Resp message 400 as previously described with reference to FIG. 4.

As described above, the CSPF method has been designed with the ability to calculate a primary ERO and an optional backup ERO for each traffic demand. Simulations have demonstrated that the time required to calculate the backup ERO is quite small as compared to that required to build the network graph and calculate the primary ERO. Specifically, more than 80% of the total time to calculate both EROs is used in building the network graph. However, by using both the primary and backup EROs, the failure probability of establishing an LSP decreases significantly. Stated alternatively, the probability of establishing a successful connection through the OTN is greatly improved through use of both the primary and backup EROs.

For example, suppose that the failure events of reserving an LSP using RSVP-TE or LDP on the primary ERO and on the backup ERO are independent, due to the fact that these EROs are SLRG diverse with one another. If the failure ratio for an LSP reservation using the primary ERO is, on average, 0.2, then the failure possibility of reserving an LSP by using both the primary ERO and the backup ERO is 0.04. Simulation of restoration services following fiber failure (e.g., a fiber cut) shows an increased probability of the first attempt path establishment failure due to competing network requests. The restoration success rate is increased when crankback (i.e., a second attempt using a second ERO) is incorporated.

Another advantage of calculating both a primary ERO and a backup ERO is that the backup ERO can be used to protect the primary ERO in case of critical data transfer. It is worth mentioning that the CSPF method takes the load-balancing issue into account, thereby improving the possibility of successfully establishing the LSP by using either the primary ERO or the backup ERO.

Based upon the foregoing Detailed Description, it should be readily apparent that the present invention advantageously provides a constraint-based method of calculating a shortest path between a pair of nodes in an OTN.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A traffic network element ("TNE") in a network, the TNE comprising:
   a traffic engineering network database ("TEND") that stores network topology information for the network and bandwidth availability information for links in the network;
   a routing engine that receives a request for a label switched path ("LSP") through the network with specified constraints, processes network topology information from the TEND to create a network graph comprising links meeting the specified constraints, and computes a primary path through the network, wherein the primary path comprises links selected from the network graph; and
   wherein if two or more links have the same cost, the one of the links having the greatest number of data-bearing channels is selected to comprise a portion of the primary path.

2. The TNE of claim 1 wherein the routing engine computes the primary path by applying a shortest path first ("SPF") algorithm to the network graph.

3. The TNE of claim 1 wherein the routing engine prunes the network graph to eliminate therefrom links comprising the primary path.

4. The TNE of claim 3 wherein the routing engine computes a backup path through the network, wherein the backup path comprises links selected from the pruned network graph.

5. The TNE of claim 4 wherein the routing engine computes the backup path by applying a shortest path first ("SPF") algorithm to the pruned network graph.

6. A method of computing an explicit route through a network comprising:
   receiving a path setup request message for a new traffic flow in the network, wherein the path setup request message includes specified constraints on the path;
   generating a network graph from network information stored in a traffic engineering network database ("TEND"), wherein links not meeting the specified constraints for the path are not included in the graph; and
   calculating a primary explicit route through the network from the generated network graph, wherein a link with a maximum number of data-bearing channels is selected for inclusion in the primary explicit route in a case in which two or more links have a same cost.

7. The method of claim 6 further comprising:
   regenerating the network graph by eliminating from the network graph links that are in the primary explicit route; and
   calculating a backup explicit route from the regenerated network graph.

8. The method of claim 6 further comprising:
   regenerating the network graph by eliminating from the network graph all links connected to nodes that are in the primary explicit route links; and
   calculating a backup explicit route from the regenerated network graph.

9. The method of claim 6 further comprising:
   regenerating the network graph by eliminating from the network graph links in the same shared risk group as a link in the primary explicit route; and
   calculating a backup explicit route from the regenerated network graph.

10. The method of claim 6 wherein the calculating a primary explicit route and calculating a backup explicit route are performed using a least cost analysis.

11. A method of computing an explicit route through a network comprising:
   receiving a path setup request message for a new traffic flow in the network, wherein the path setup request message includes specified constraints on the path;
   generating a network graph from network information stored in a traffic engineering network database ("TEND"), wherein links not meeting the specified constraints for the path are not included in the graph; and
   calculating a primary explicit route through the network from the generated network graph;
   calculating a backup explicit route from a regenerated network graph;
   wherein the calculating a primary explicit route and the calculating a backup explicit route are performed using a least cost analysis; and wherein a link with a maximum number of data-bearing channels is selected from the regenerated network graph for inclusion in the backup explicit route in a case in which two or more links have a same cost.

12. The method of claim 10 wherein the least cost analysis comprises a shortest path algorithm.

13. The method of claim 6 wherein the network information stored in the TEND comprises network resources availability information and network topology information.

14. A traffic network element ("TNE") in a network, the TNE comprising:
   means for storing network topology information for the network and bandwidth availability information for links in the network; and
   means for processing information from the TEND to create a network graph comprising links meeting specified constraints in a request for a label switched path ("LSP") and calculating a primary explicit route through the network, wherein the primary explicit route comprises links selected from the network graph and wherein if two or more links have the same cost, the one of the links having the greatest number of data-bearing channels is selected to comprise a portion of the primary explicit route.

15. The TNE of claim 14 wherein the primary explicit route is calculated by applying a least cost analysis to the network graph.

16. The TNE of claim 14 wherein the primary explicit route is calculated by applying a shortest path first ("SPF") algorithm to the network graph.

17. The TNE of claim 14 further comprising means for pruning the network graph to eliminate therefrom at least one of links and nodes that are not diverse with links and nodes included in the primary explicit route.

18. The TNE of claim 14 further comprising means for pruning the network graph to eliminate therefrom links that are connected to nodes that are not diverse with nodes included in the primary explicit route.

19. The TNE of claim 14 further comprising means for pruning the network graph to eliminate therefrom links that are in the same shared risk group as a link included in the primary explicit route.

20. The TNE of claim 14 further comprising means for calculating a backup explicit route through the network, wherein the backup explicit route comprises links selected from the pruned network graph.

21. The TNE of claim 20 wherein the backup explicit route is calculated by applying a least cost analysis to the pruned network graph.

22. The TNE of claim 20 wherein the backup explicit route is calculated by applying a shortest path first ("SPF") algorithm to the pruned network graph.

* * * * *